United States Patent Office 2,998,350
Patented Aug. 29, 1961

2,998,350
ARTICLE OF MANUFACTURE FOR THE TREATMENT OF ALCOHOLISM
Alfred Charles de Grunigen, Nanuet, N.Y., and James Kenneth Wallace Ferguson, Toronto, Ontario, Canada, assignors of one-half to American Cyanamid Company, New York, N.Y., a corporation of Maine, and one-half to Alcoholism Research Foundation, Toronto, Ontario, Canada
No Drawing. Filed Apr. 2, 1959, Ser. No. 803,567
3 Claims. (Cl. 167—82)

This invention relates to a new article of manufacture for the treatment of alcoholism. More particularly, it relates to tablets containing calcium cyanamide as the principal effective ingredient suitable for oral administration to patients to aid them in abstaining from alcoholic beverages.

In recent years, drugs have been used as an aid in the control of habitual alcoholism. Some of these, such as tetraethylthiuram disulfide, have been extensively employed with, however, definite disadvantages which include unpleasant side reactions other than those caused by alcohol. These include drowsiness, nausea, central nervous depression, unpleasant taste, bad breath, unpleasant body odors, and unreliability. Also, the drug has the additional disadvantages in that it may not become effective for several hours to a week after ingestion; and it appears to be cumulative in the body. There is a need, therefore, for a better drug for the control of the drinking habit of chronic alcoholics.

It has been known for years that calcium cyanamide has an effect similar to diethylthiuram disulfide in causing a disagreeable reaction to alcoholic beverages when they are consumed after dosage with the drug. The syndrome caused by alcohol after ingestion of calcium cyanamide has been called "mal rouge." It is characterized by intense flushing of the face and neck, and often of the whole body, accompanied by a rapid pulse, a pounding heart, and panting respiration. Nausea and vomiting also follow and in more severe reactions a precipitous drop in blood pressure may occur. It has been postulated that drugs such as diethylthiuram disulfide and calcium cyanamide inhibit the enzyme system of the liver which normally controls the oxidation of alcohol in the body with the result that acetaldehyde is formed. This is evidenced by the fact that acetaldehyde can be tasted by the subject and smelled on his breath.

Although calcium cyanamide is produced in huge quantities as a basic chemical substance and is generally considered to be remarkably free from toxic effects other than those noted above which occur following the consumption of alcohol, it has not been commercially available in forms suitable for medical purposes. Crude calcium cyanamide as commercially available contains a number of impurities which are of toxic nature, and this material should not be used in medicine without purification. It is also unfortunate that if calcium cyanamide is administered without means being taken to control its absorption by the body, a sharp reaction with unpleasant sensations not easily described is likely to follow. Investigation has shown that these reactions are due to a too rapid absorption of the calcium cyanamide in the blood stream. In addition, calcium cyanamide tends to decompose in nonacidic aqueous systems with the liberation of ammonia. This is a disadvantage during the manufacture of dosage forms of the material, during storage and sometimes upon taking the material.

Although calcium cyanamide and tetraethylthiuram disulfide produce the same general type of reaction in a patient upon consumption of alcohol, calcium cyanamide has the advantage that it is more predictable in its action and is effective almost immediately after the drug is taken. Control of the undesirable features of calcium cyanamide, the rapid absorption rate and consequent unpleasant sensations that may be experienced with the use, should make this material a very useful agent in the control of habitual alcoholism. It is believed that these objectives are accomplished by the present invention.

The new article of manufacture of the present invention comprises a tablet containing an effective dosage amount of calcium cyanamide and other agents which have an effect on the rate at which the cyanamide is released after ingestion. When tablets containing calcium cyanamide are made in the usual manner with conventional ingredients, they disintegrate too rapidly and the undesirable side reactions of calcium cyanamide are experienced. Efforts to prepare tablets which disintegrate more slowly were not satisfactory because it was found that the calcium cyanamide leached out of the tablet before it disintegrated.

There is a high incidence of achlorhydria in alcoholics; and in such patients, calcium cyanamide was found to liberate ammonia in the stomach. These several difficulties have been solved by the present invention.

To illustrate these considerations, various tablets containing calcium cyanamide were prepared. For instance, a formulation was prepared and compressed into tablets having the following composition:

| | Gram |
|---|---|
| Calcium cyanamide | 0.1 |
| Sodium chloride | 0.375 |
| Citric acid | 0.1 |
| Methylcellulose | 0.025 |

It was found that a short time after taking one of these tablets, the patient suffered from extreme intestinal discomfort due to the liberation of calcium cyanamide in the intestinal tract at too rapid a rate after ingestion. Laboratory tests of these tablets indicated that they had a disintegration time of one hour and it was evident that a tablet with a slower disintegration time was needed.

Tablets having a disintegration time of five and one half hours were then prepared having the following composition:

| | Gram |
|---|---|
| Calcium cyanamide | 0.05 |
| Citric acid | 0.1 |
| Dicalcium phosphate granulation | 0.642 |
| Magnesium stearate | 0.016 |

When these tablets were used, it was found that the patient suffered the same severe side reactions as in the case of the tablets first described. It was found that this was because of the fact that the calcium cyanamide leached out of the tablet long before it disintegrated.

The dicalcium phosphate granulation used in the above tablets was prepared in conventional manner. Six thousand four hundred grams of gum acacia powder was dissolved in 15 liters of boiling distilled water. Ninety-four thousand grams of dicalcium phosphate was granulated with this solution by conventional granulating methods; that is, the dicalcium phosphate powder was placed in a pony mixer and the gum acacia solution slowly added as the mixing continued. The wet granulation was then dried at room temperature or slightly higher, disintegrated with a hammer mill and screened to a size of approximately 12 mesh. It was then dried again at 110° C. for 12 hours to remove all traces of moisture.

Another formulation which proved to be unsatisfactory contained the following per tablet:

| | | |
|---|---|---|
| Calcium cyanamide | gram | 0.05 |
| Citric acid | do | 0.10 |
| Methocel 400 | do | 0.05 |
| Magnesium stearate | milligrams | 50.0 |

When efforts were made to produce tablets with this composition, it was found that they were too soft.

Satisfactory tablets were prepared with the following composition per tablet:

| | Gram |
|---|---|
| Calcium cyanamide | 0.050 |
| Citric acid (anhydrous) | 0.10 |
| Methocel 4000 | 0.075 |
| Dicalcium phosphate granulation | 0.609 |
| Magnesium stearate | 0.016 |

These tablets were prepared by mixing together 50 grams of calcium cyanamide, 100 grams of citric acid, 75 grams of methylcellulose, and 609 grams of the dicalcium phosphate granulation described above. The mixed materials were then put through a 12-mesh screen. To this mixture was added 16 grams of magnesium stearate which had been passed through a 20-mesh screen. The whole was mixed in a roller mill and compressed into tablets by a Stokes tablet press.

These tablets when administered to human patients were found to be entirely satisfactory, and they provided a means of administering calcium cyanamide without development of the preliminary side reactions that occur when calcium cyanamide is administered without precaution as to rate of release and protection against formation of ammonia.

The amount of calcium cyanamide in each dosage unit form may vary considerably from about 10 milligrams to 150 miligrams per tablet, preferably from about 50 to 100 milligrams per tablet. As noted above, care should be taken to use a pharmaceutically pure grade of calcium cyanamide. This material is often referred to as white cyanamide to distinguish it from the calcium cyanamide of commerce which is almost black. The cyanamide used in these tablets should be 95 percent pure or better.

Although methylcellulose is the preferred gum for preparing calcium cyanamide tablets for use in the control of alcoholism, other non-toxic water-soluble gums which tend to swell when placed in water to from a gelatinous phase may be used in place of methylcellulose. A study of the function of the methylcellulose in the successful tablets indicated that it served somewhat as a plug in the interstices of the water-insoluble phase, the dicalcium phosphate and prevented too rapid penetration of aqueous fluids into the interior of the tablet with consequent leaching of the water-soluble calcium cyanamide phase. Other suitable hydrophilic gums which may be substituted for methylcellulose in these tablets which tend to become gelatinous on contact with water include gum acacia, guar gum, tragacanth, locust bean gum, carboxymethylcellulose, gelatin, gum tragacanth, gum karaya, gum ghatti, sodium alginate, Irish moss, pectin, and sodium cellulose sulfate. These are used in amounts ranging from about 5 to 15 percent by weight of the tablet. The Methocel 4000 used in the preferred formulations is a commercially available brand of methylcellulose having an average molecular weight of 4000, and has the above-described hydrophilic qualities.

It is important in practicing the present invention that these gums be mixed with the active ingredients, calcium cyanamide and citric acid, and the granulated inert phase. This is necessary so that the gums might exercise the function of blocking the interstices of the granulated water-insoluble phase, thus preventing leaching of the active ingredients from the tablet. As will be seen, therefore, these gums perform a function other than that of the conventional binding agents which are generally incorporated in the granulation which, itself, has binding agents.

The inert water-insoluble phase of the tablets is preferably a dicalcium phosphate granulation as described above. Other non-toxic, water-insoluble substances which are chemically non-reactive with citric acid, calcium cyanamide and water, which are dense, have a good body and are capable of being granulated, can be used in place of dicalcium phosphate. These include tricalcium phosphate, magnesium phosphate, kaolin, diatomaceous earth, magnesium aluminum silicate, precipitated silica, talc, bentonite, terra alba, titanium dioxide and various other similar materials, the use of which is well known in the tablet-making art. The amount of these water-insoluble substances is not critical but should be on the order of 50 percent to 80 percent by weight of the tablets. The same gums named above may be used as a binding agent for the granulation in amounts ranging from about 5 to 15 percent by weight of the dicalcium phosphate or other inert substance.

Citric acid has been described above as the non-toxic solid, water-soluble organic acid and as it is cheap and satisfactory, it is preferred. However, the invention is in no sense limited to the use of citric acid and any non-toxic solid organic acid having a negative log of dissociation constant, $pk_1$ not over 5, may be used. Weaker acids are not as satisfactory. Typical acids which have the desired dissociation constant are tartaric acid, ascorbic acid, glutamic acid and the like. While any non-toxic solid organic acid having a $pk_1$ not over 5 can be used satisfactorily, the amount of the acid used will vary somewhat with the strength of the acid and of course with its molecular weight. The amount of acid must be sufficient to neutralize the calcium of the calcium cyanamide and to maintain the pH of the medium below 5 and preferably below 4. In the case of citric acid, two parts by weight of the acid to one part of calcium cyanamide are suitable but of course larger amounts may be used, for example three parts of acid per part of calcium cyanamide.

Although weaker organic acids are not useful, strong mineral acid salts of weak organic bases or of amino acids such as glycine hydrochloride, glycine sulfate and leucine hydrochloride may be used. These compounds are capable of neutralizing the calcium and of maintaining a pH not over 5. As in the case of the organic acids themselves, it is necessary to use a sufficient amount and the amount will vary with different compounds but is a simple matter of computation. The acid, or acid substances in the case of the mineral acid salts of the weak bases, prevent liberation of ammonia during the manufacture and storage of the tablets and after the tablet is ingested. The difficulties produced from achlorhydria, which normally results from the use of calcium cyanamide, are therefore prevented.

The magnesium stearate used in the successful tablets acts as a mold lubricant and performs no essential function in the physiological action of the tablet. Other mold lubricants such as calcium stearate, zinc stearate, stearic acid, talc, sodium benzoate, mineral oils, boric acid; fillers; excipients; flavoring and coloring agents may, of course, be added if desired. Inasmuch as the use of these conventional substances is a matter within the skill of the art, further elaboration concerning their usage appears to be unnecessary.

Publications describing the clinical results obtained with these tablets may be found in the Canadian Medical Association Journal, 74, 793–798 (1956): (1) A New Drug for the Treatment of Alcoholism, J. K. W. Ferguson; (2) A New Protective Drug in the Treatment of Alcoholism, Armstrong and Kerr; and, (3) Clinical Trial of Citrated Calcium Carbamide, R. G. Bell.

This application is in part a continuation of our copending application Serial No. 620,170, filed November 5, 1956, now abandoned.

We claim:

1. An article of manufacture in dosage unit form suitable for oral administration for the control of alcoholism, a tablet comprising from 10 to 150 milligrams of calcium cyanamide, a non-toxic, solid, water-soluble organic acid substance having a $pk_1$ not in excess of 5, the amount of the acid substance being sufficient to neutralize the calcium of the calcium cyanamide present and to maintain a pH below 5, 50 to 80 percent by weight of a granulation comprising a non-toxic, hydrophilic, water-soluble gum granulated with a comminuted non-toxic, water-insoluble inorganic substance, said water-soluble gum being present in an amount 5 to 15 percent by weight of the comminuted water-insoluble inorganic substance, said comminuted, water-insoluble inorganic substance being chemically non-reactive with the calcium cyanamide, the organic acid substance and water, said tablet being characterized by stability against release of ammonia on storage or ingestion and gradual release of calcium cyanamide over a period between about 1 to 5 hours.

2. An article of manufacture according to claim 1 in which the acid substance is citric acid, the water-insoluble inorganic substance is dicalcium phosphate and the hydrophilic, water-soluble gum is methylcellulose.

3. An article of manufacture according to claim 1 in which the acid substance is citric acid, the water-insoluble inorganic substance is dicalcium phosphate and the hydrophilic, water-soluble gum is gum acacia.

References Cited in the file of this patent
UNITED STATES PATENTS

| | | |
|---|---|---|
| 2,798,837 | Sahyun | July 9, 1957 |
| 2,809,917 | Mermelin | Oct. 15, 1957 |

OTHER REFERENCES

American Cyanamid, Trademark File 659,516, reg. March 18, 1958 (1 page Principal Register Trademark and 1 page specimen label).

Merck Index, 6th ed., Merck and Co., Rahway, N.J., 1952, page 296, entry "Cyanamide."